US010622713B2

United States Patent
Ma

(10) Patent No.: US 10,622,713 B2
(45) Date of Patent: Apr. 14, 2020

(54) BEAM SIGNAL TRACKING METHOD, DEVICE AND SYSTEM

(71) Applicant: Huawei Technologies Co., Ltd., Shenzhen (CN)

(72) Inventor: Jun Ma, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 204 days.

(21) Appl. No.: 15/821,404

(22) Filed: Nov. 22, 2017

(65) Prior Publication Data

US 2018/0076520 A1 Mar. 15, 2018

Related U.S. Application Data

(63) Continuation of application No. PCT/CN2015/079765, filed on May 26, 2015.

(51) Int. Cl.
*H01Q 3/36* (2006.01)
*G01S 13/72* (2006.01)
(Continued)

(52) U.S. Cl.
CPC ............. *H01Q 3/36* (2013.01); *G01S 13/66* (2013.01); *G01S 13/72* (2013.01); *G01S 13/74* (2013.01)

(58) Field of Classification Search
CPC .......... G01S 13/66; G01S 13/72; G01S 13/74; H01Q 3/36
(Continued)

(56) References Cited

U.S. PATENT DOCUMENTS 4,041,496 A  8/1977 Norris
4,520,493 A  5/1985 Heard et al.
(Continued)

FOREIGN PATENT DOCUMENTS

CN  1178615 A  4/1998
CN  1301970 A  7/2001
(Continued)

OTHER PUBLICATIONS

Machine Translation and Abstract of Chinese Publication No. CN1301970, Jul. 4, 2001, 9 pages.
(Continued)

*Primary Examiner* — Timothy X Pham
(74) *Attorney, Agent, or Firm* — Conley Rose, P.C.

(57) ABSTRACT

A beam signal tracking method, device, and system, where the method includes obtaining a Doppler frequency shift of a receive-beam signal, determining a Doppler frequency shift change speed of the receive-beam signal according to the Doppler frequency shift, determining a scanning speed and a scanning angle step size of the receive-beam signal according to the Doppler frequency shift change speed, scanning the receive-beam signal according to the scanning speed and the scanning angle step size, determining a beam angle that is formed when the receive-beam signal is aligned with a transmit-beam signal, determining phase configuration information of a phase shifter according to the beam angle that is formed when the receive-beam signal is aligned with the transmit-beam signal, and configuring the phase shifter according to the phase configuration information of the phase shifter such that the receive-beam signal is aligned with the transmit-beam signal.

20 Claims, 5 Drawing Sheets

(51) Int. Cl.
*G01S 13/66* (2006.01)
*G01S 13/74* (2006.01)

(58) Field of Classification Search
USPC .......................................................... 342/372
See application file for complete search history.

(56) References Cited

U.S. PATENT DOCUMENTS

| | | | |
|---|---|---|---|
| 5,691,974 | A | 11/1997 | Zehavi et al. |
| 6,229,475 | B1 | 5/2001 | Woolley |
| 6,236,363 | B1 | 5/2001 | Robbins et al. |
| 2006/0220946 | A1* | 10/2006 | Nohmi ................. G01S 7/35 342/107 |
| 2007/0205943 | A1 | 9/2007 | Nassiri-Toussi et al. |
| 2009/0091490 | A1 | 4/2009 | Tu et al. |
| 2010/0265123 | A1 | 10/2010 | Lancashire |
| 2012/0056779 | A1* | 3/2012 | Freking ................. G01S 7/5273 342/189 |
| 2013/0027250 | A1* | 1/2013 | Chen ................. H01Q 3/267 342/368 |
| 2014/0254490 | A1 | 9/2014 | Jain et al. |
| 2016/0029434 | A1 | 1/2016 | Qiu et al. |
| 2019/0082420 | A1 | 3/2019 | Yu et al. |

FOREIGN PATENT DOCUMENTS

| | | | |
|---|---|---|---|
| CN | 1769925 | A | 5/2006 |
| CN | 101207235 | A | 6/2008 |
| CN | 101561970 | A | 10/2009 |
| CN | 101936756 | A | 1/2011 |
| CN | 102176010 | A | 9/2011 |
| CN | 102439479 | A | 5/2012 |
| CN | 103323847 | A | 9/2013 |
| CN | 104122548 | A | 10/2014 |
| CN | 104297747 | A | 1/2015 |
| EP | 2503833 | A1 | 9/2012 |
| WO | 2014117855 | A1 | 8/2014 |
| WO | 2014131167 | A1 | 9/2014 |
| WO | 2014179985 | A1 | 11/2014 |

OTHER PUBLICATIONS

Machine Translation and Abstract of Chinese Publication No. CN1769925, May 10, 2006, 13 pages.
Machine Translation and Abstract of Chinese Publication No. CN101561970, Oct. 21, 2009, 29 pages.
Machine Translation and Abstract of Chinese Publication No. CN101936756, Jan. 5, 2011, 41 pages.
Machine Translation and Abstract of Chinese Publication No. CN102176010, Sep. 7, 2011, 28 pages.
Machine Translation and Abstract of Chinese Publication No. CN103323847, Sep. 25, 2013, 21 pages.
Machine Translation and Abstract of Chinese Publication No. CN104122548, Oct. 29, 2014, 11 pages.
Foreign Communication From A Counterpart Application, PCT Application No. PCT/CN2015/079765, English Translation of International Search Report dated Feb. 25, 2016, 3 pages.
Machine Translation and Abstract of Chinese Publication No. CN101207235, Jun. 25, 2008, 15 pages.
Machine Translation and Abstract of Chinese Publication No. CN104297747, Jan. 21, 2015, 15 pages.
Foreign Communication From A Counterpart Application, Chinese Application No. 201580019785.X, Chinese Office Action dated Jun. 5, 2019, 6 pages.
Foreign Communication From A Counterpart Application, European Application No. 15892878.8, Extended European Search Report dated Mar. 23, 2018, 6 pages.
Foreign Communication From A Counterpart Application, Korean Application No. 10-2017-7022945, Korean Notice of Allowance dated Jan. 22, 2020, 2 pages.

* cited by examiner

BEAM SIGNAL TRACKING METHOD, DEVICE AND SYSTEM

CROSS-REFERENCE TO RELATED APPLICATIONS

This application is a continuation of International Patent Application No. PCT/CN2015/079765 filed on May 26, 2015. The disclosure of the aforementioned application is hereby incorporated by reference in its entirety.

TECHNICAL FIELD

The present disclosure relates to the communications technologies, and in particular, to a beam signal tracking method, device, and system.

BACKGROUND

In a phase-control microwave communications technology, movement or scanning of antenna beam pointing in space is implemented mainly depending on a phase change. A phased array includes several parts such as an antenna array, a phase shifter, a feeder network, and a corresponding control circuit. The antenna array includes multiple antenna units, and a phase shifter is disposed at a rear end of each antenna unit and is used to change a signal phase of the antenna unit. Phase configuration of the phase shifter is controlled using a corresponding control circuit to form a transmit beam or a receive beam with a specific pointing. A transmitter (Tx) completes directional transmission using a phased array. Correspondingly, a receiver (Rx) also completes directional receiving using a phased array. A transmit beam is aligned with a receive beam by means of beam tracking to implement relatively high beamforming transmission quality.

In an existing phase-control microwave communications technology, in a beam tracking implementation process, beam tracking is performed at a fixed scanning speed and a scanning angle step size. During each tracking process, received signal powers corresponding to different beam angles are detected in sequence at an Rx. When a detected receive power is maximum, a beam angle at this moment is considered as a beam alignment angle. Then, configuration and phase shifting are performed on the phase shifter using a phase shifter control signal at this moment. Each time beam scanning is performed, there is a delay from the moment when configuration of the phase shifter is started to the moment when phase configuration of the phase shifter takes effect. A delay value depends on a time it takes for a control circuit to generate a phase shift configuration phase plus a delay of a radio frequency electrically controlled phase shifter. These delays occupy air-interface overheads of a corresponding size in an air-interface frame. The air-interface overheads corresponding to these delays and a phase estimation sequence in the air-interface frame occupy a fixed quantity of symbols in the air-interface frame.

In an existing phase control system, a higher scanning speed indicates a higher frequency at which a phase shifter is configured, better beam tracking quality implemented, and a shorter frame length of a corresponding air-interface frame. However, a quantity of symbols used for beam tracking is fixed, that is, a greater proportion of air-interface overheads used for beam tracking indicates less transmitted effective data, that is, lower transmission efficiency. On the contrary, a scanning lower speed indicates a lower frequency at which a phase shifter is configured, and a longer frame length of a corresponding air-interface frame. However, the quantity of symbols used for beam tracking is fixed, that is, a lower proportion of air-interface overheads used for beam tracking indicates more transmitted effective data, that is, higher transmission efficiency. However, relatively good beam tracking quality cannot be implemented.

In the phase control system of other approaches, high-speed mobile beam tracking can be performed only at a fixed scanning speed and a scanning angle step size. When a Tx and an Rx are relatively static or relatively distant from each other, a beam angle changes very slowly or even does not change. In this case, an excessively high beam scanning speed and scanning angle step size are not needed. If beam tracking is performed at a relatively high beam scanning speed and scanning angle step size, low data transmission efficiency is caused.

SUMMARY

The present disclosure provides a beam signal tracking method, device, and system to adaptively adjust a scanning speed and a scanning angle step size in a beam signal tracking process, and implement maximum data transmission efficiency.

According to a first aspect, a beam signal tracking method is provided, including obtaining a Doppler frequency shift of a receive-beam signal, determining a Doppler frequency shift change speed of the receive-beam signal according to the Doppler frequency shift, determining a scanning speed and a scanning angle step size of the receive-beam signal according to the Doppler frequency shift change speed, scanning the receive-beam signal according to the scanning speed and the scanning angle step size, determining a beam angle that is formed when the receive-beam signal is aligned with a transmit-beam signal, where the beam angle that is formed when the receive-beam signal is aligned with the transmit-beam signal is a beam angle corresponding to a maximum power of the receive-beam signal, determining phase configuration information of a phase shifter according to the beam angle that is formed when the receive-beam signal is aligned with the transmit-beam signal, and configuring the phase shifter according to the phase configuration information of the phase shifter such that the receive-beam signal is aligned with the transmit-beam signal.

With reference to an implementation manner of the first aspect, in a first possible implementation manner of the first aspect, determining a scanning speed and a scanning angle step size of the receive-beam signal according to the Doppler frequency shift change speed includes performing normalization processing on the Doppler frequency shift change speed, and determining the scanning speed and the scanning angle step size according to the normalized Doppler frequency shift change speed.

With reference to the first aspect or the first possible implementation manner of the first aspect, in a second possible implementation manner of the first aspect, determining the scanning speed and the scanning angle step size according to the normalized Doppler frequency shift change speed includes increasing the scanning speed and the scanning angle step size when the normalized Doppler frequency shift change speed increases, reducing the scanning speed and the scanning angle step size when the normalized Doppler frequency shift change speed decreases, and maintaining the scanning speed and the scanning angle step size when the normalized Doppler frequency shift change speed remains unchanged.

With reference to any one of the first aspect or the first to the second possible implementation manners of the first aspect, in a third possible implementation manner of the first aspect, determining a Doppler frequency shift change speed includes calculating a gradient value of the Doppler frequency shift to obtain the Doppler frequency shift change speed, or calculating a derivative value of the Doppler frequency shift to obtain the Doppler frequency shift change speed.

With reference to any one of the first aspect or the first to the third possible implementation manners of the first aspect, in a fourth possible implementation manner of the first aspect, the determining a Doppler frequency shift change speed includes calculating a gradient value and a derivative value of the Doppler frequency shift, and calculating an average value of the gradient value and the derivative value of the Doppler frequency shift to obtain the Doppler frequency shift change speed.

According to a second aspect, a beam signal tracking apparatus is provided, including a determining unit configured to obtain a Doppler frequency shift of a receive-beam signal, and determine a Doppler frequency shift change speed of the receive-beam signal according to the Doppler frequency shift, a processing unit configured to determine a scanning speed and a scanning angle step size of the receive-beam signal according to the Doppler frequency shift change speed, a phase control unit configured to scan the receive-beam signal according to the scanning speed and the scanning angle step size, and determine a beam angle that is formed when the receive-beam signal is aligned with a transmit-beam signal, where the beam angle that is formed when the receive-beam signal is aligned with the transmit-beam signal is a beam angle corresponding to a maximum power of the receive-beam signal, and a configuration unit configured to determine phase configuration information of a phase shifter according to the beam angle that is formed when the receive-beam signal is aligned with the transmit-beam signal, and configure the phase shifter according to the phase configuration information of the phase shifter such that the receive-beam signal is aligned with the transmit-beam signal.

With reference to an implementation manner of the second aspect, in a first possible implementation manner of the second aspect, the processing unit is further configured to perform normalization processing on the Doppler frequency shift change speed, and determine the scanning speed and the scanning angle step size according to the normalized Doppler frequency shift change speed.

With reference to the second aspect or the first possible implementation manner of the second aspect, in a second possible implementation manner of the second aspect, the processing unit is further configured to increase the scanning speed and the scanning angle step size when the normalized Doppler frequency shift change speed increases, reduce the scanning speed and the scanning angle step size when the normalized Doppler frequency shift change speed decreases, and maintain the scanning speed and the scanning angle step size when the normalized Doppler frequency shift change speed remains unchanged.

With reference to any one of the second aspect or the first to the second possible implementation manners of the second aspect, in a third possible implementation manner of the second aspect, the determining unit is further configured to calculate a gradient value of the Doppler frequency shift to obtain the Doppler frequency shift change speed, or calculate a derivative value of the Doppler frequency shift to obtain the Doppler frequency shift change speed.

With reference to any one of the second aspect or the first to the third possible implementation manners of the second aspect, in a fourth possible implementation manner of the second aspect, the determining unit is further configured to calculate a gradient value and a derivative value of the Doppler frequency shift, and calculate an average value of the gradient value and the derivative value of the Doppler frequency shift to obtain the Doppler frequency shift change speed.

According to a third aspect, a communications device is provided, including a transceiver antenna array, a phase shifter, a memory, and a processor coupled with the memory, where phase shifter is coupled to each antenna unit in the transceiver antenna array, and the processor is configured to obtain a Doppler frequency shift of a receive-beam signal, determine a Doppler frequency shift change speed of the receive-beam signal according to the Doppler frequency shift, determine a scanning speed and a scanning angle step size of the receive-beam signal according to the Doppler frequency shift change speed, scan the receive-beam signal according to the scanning speed and the scanning angle step size, determine a beam angle that is formed when the receive-beam signal is aligned with a transmit-beam signal, where the beam angle that is formed when the receive-beam signal is aligned with the transmit-beam signal is a beam angle corresponding to a maximum power of the receive-beam signal, determine phase configuration information of a phase shifter according to the beam angle that is formed when the receive-beam signal is aligned with the transmit-beam signal, and configure the phase shifter according to the phase configuration information of the phase shifter such that the receive-beam signal is aligned with the transmit-beam signal.

With reference to an implementation manner of the third aspect, in a first possible implementation manner of the third aspect, the processor is further configured to perform normalization processing on the Doppler frequency shift change speed, and determine the scanning speed and the scanning angle step size according to the normalized Doppler frequency shift change speed.

With reference to the third aspect or the first possible implementation manner of the third aspect, in a second possible implementation manner of the third aspect, the processor is further configured to increase the scanning speed and the scanning angle step size when the normalized Doppler frequency shift change speed increases, reduce the scanning speed and the scanning angle step size when the normalized Doppler frequency shift change speed decreases, and maintain the scanning speed and the scanning angle step size when the normalized Doppler frequency shift change speed remains unchanged.

With reference to any one of the third aspect or the first to the second possible implementation manners of the third aspect, in a third possible implementation manner of the third aspect, the processor is further configured to calculate a gradient value of the Doppler frequency shift to obtain the Doppler frequency shift change speed, or calculate a derivative value of the Doppler frequency shift to obtain the Doppler frequency shift change speed.

With reference to any one of the third aspect or the first to the third possible implementation manners of the third aspect, in a fourth possible implementation manner of the third aspect, the processor is further configured to calculate a gradient value and a derivative value of the Doppler frequency shift, and calculate an average value of the gradient value and the derivative value of the Doppler frequency shift to obtain the Doppler frequency shift change speed.

According to a fourth aspect, a phase control microwave communications system is provided, including a base station and user equipment, where at least one of the base station and the user equipment includes the beam signal tracking apparatus provided in the second aspect.

According to a fifth aspect, a phase control microwave communications system is provided, including the communications device provided in the third aspect.

Embodiments of the present disclosure provide a beam signal tracking method, device, and system. During a beam signal tracking process, a scanning speed and a scanning angle step size in the beam tracking process are adaptively adjusted using a Doppler frequency shift change speed of a receive-beam signal. While a beam tracking quality is ensured, maximum data transmission efficiency is achieved, and communication efficiency is improved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The embodiments of the present disclosure can be used in various applications. Some embodiments of the present disclosure may be used in combination with various devices and systems. The devices and systems are, for example, a transmitter, a receiver, a transceiver, a wireless communications station, a wireless communications device, a wireless access point, a wireless modem, a mobile computer, a laptop, a tablet computer, a handheld device, and a cell phone.

The embodiments of the present disclosure are applicable to, for example, a process of tracking a beam signal used together with phased arrays. Each phased array includes several parts such as an antenna array, a phase shifter, a feeder network, and a corresponding control circuit. The antenna array includes multiple antenna units, and a phase shifter is disposed at a rear end of each antenna unit and is used to change a signal phase of the antenna unit. Phase configuration of the phase shifter is controlled using a corresponding control circuit to form a transmit beam or a receive beam with specific pointing. The control circuit may be, for example, a baseband processor, and the feeder network may include, for example, multiple power amplifiers. Due to a non-static environment, quality of beam forming transmission may change with time, and then phase configuration of the phase shifter may be adjusted using a new beam signal tracking process in order to improve the quality of beam forming transmission.

Figure 1:
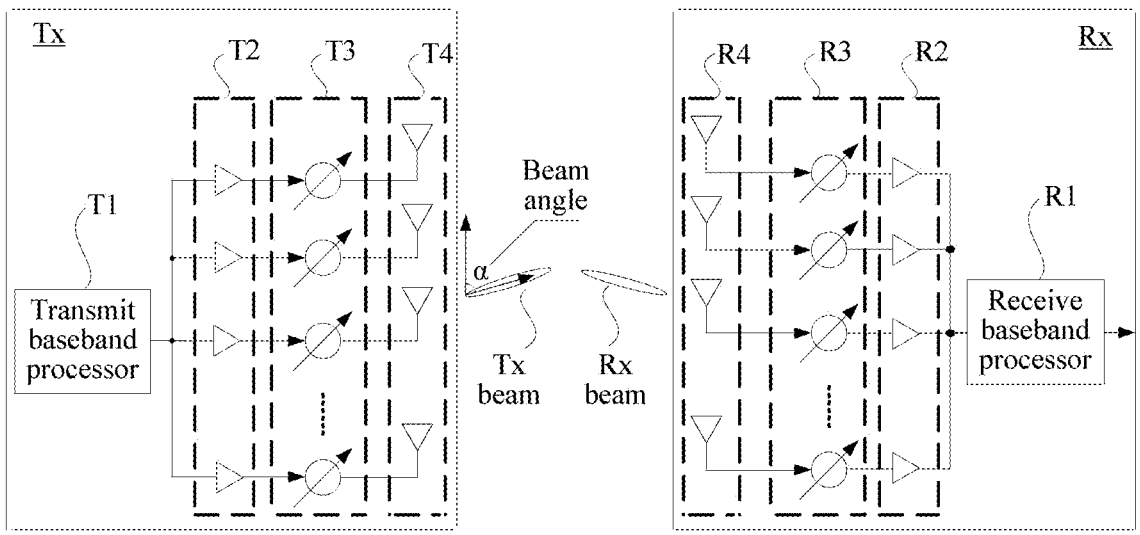
FIG. 1 is a schematic diagram of a system for simulating beam forming and tracking according to an embodiment of the present disclosure.

FIG. 1 is a schematic diagram of a system for simulating beam forming and tracking according to an embodiment of the present disclosure. As shown in FIG. 1, the system may include one or more Txs and/or one or more Rxs. The Tx may include a transmit baseband processor T1, multiple power amplifiers T2, multiple phase shifters T3, and multiple antenna units T4. The multiple power amplifiers T2 are connected to the transmit baseband processor T1, and then each power amplifier T2 is separately connected to the multiple phase shifters T3 and antenna units T4. The Rx may include a receive baseband processor R1, multiple low-noise amplifiers R2, multiple phase shifters R3, and multiple antenna units R4. Each antenna unit R4 is separately connected to the multiple phase shifters R3 and low-noise amplifiers R2, and then each low-noise amplifier R2 is connected to the receive baseband processor R1. It should be noted that although being shown as separate devices, the Tx and the Rx may be included in a single component and may share a circuit, for example, an antenna and/or a phase shifter.

In the system for simulating beam forming and tracking shown in FIG. 1, the Tx completes directional transmission using a phased array. The Tx controls phase configuration of the phase shifters T3 using the transmit baseband processor T1 and changes phases of output signals of the antenna units T4 to form a directional transmit beam. Correspondingly, the Rx also uses a phased array to complete directional receiving, controls phase configuration of the phase shifters R3 using the receive baseband processor R1, and changes phases of input signals of each antenna unit R4 to detect a receive beam. When quality of beam forming transmission changes with time, an alignment angle between a Tx beam and an Rx beam may be found using a new beam tracking process, and a beam tracking result is fed back to the transmit baseband processor T1 and the receive baseband processor R1. The transmit baseband processor T1 and the receive baseband processor R1 adaptively adjust spatial pointing of the transmit beam and the receive beam separately according to the beam tracking result.

Figure 2:
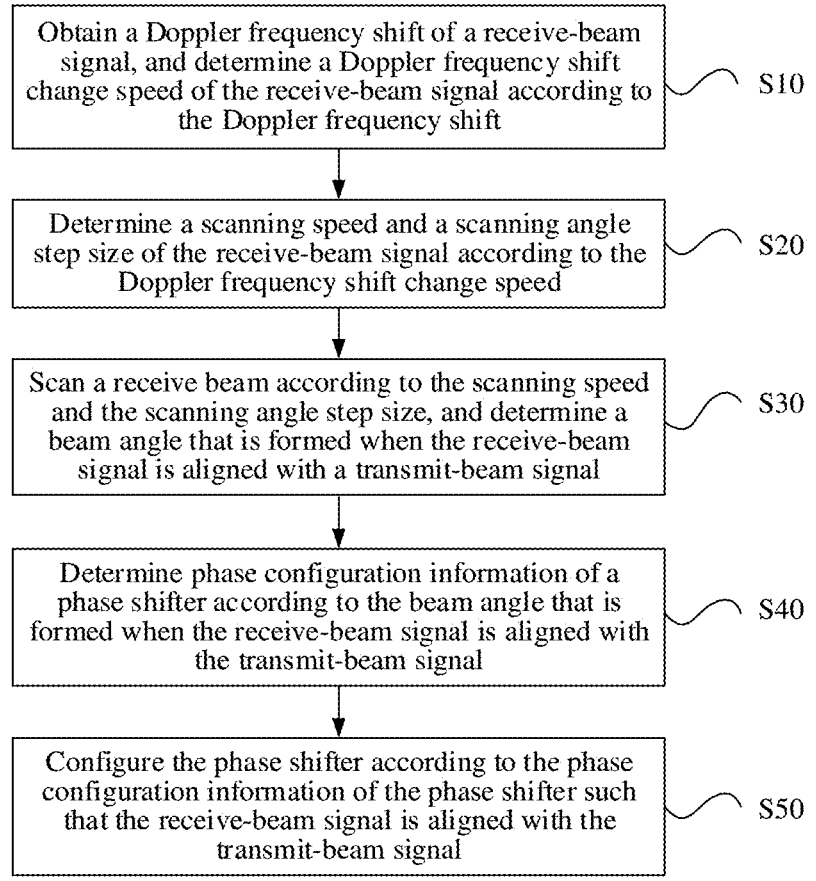
FIG. 2 is a schematic flowchart of a beam signal tracking method according to an embodiment of the present disclosure.

FIG. 2 is a schematic flowchart of a beam signal tracking method according to an embodiment of the present disclosure. As shown in FIG. 2, the beam signal tracking method provided in this embodiment includes the following steps.

Step S10: Obtain a Doppler frequency shift of a receive-beam signal, and determine a Doppler frequency shift change speed of the receive-beam signal according to the Doppler frequency shift.

Step S20: Determine a scanning speed and a scanning angle step size of the receive-beam signal according to the Doppler frequency shift change speed.

Step S30: Scan a receive beam according to the scanning speed and the scanning angle step size, and determine a beam angle that is formed when the receive-beam signal is aligned with a transmit-beam signal.

Step S40: Determine phase configuration information of a phase shifter according to the beam angle that is formed when the receive-beam signal is aligned with the transmit-beam signal.

Step S50: Configure the phase shifter according to the phase configuration information of the phase shifter such that the receive-beam signal is aligned with the transmit-beam signal.

The beam signal tracking processing procedure may be executed by a transmit end or a receive end in a wireless communications system, or may be executed cooperatively by the transmit end and the receive end. Optionally, for example, the beam signal tracking processing procedure may be executed using a baseband processor of the transmit end and/or the receive end or may be executed using a beam signal tracking apparatus.

An objective of beam signal tracking is to find a beam angle (i.e., beam angle α shown in FIG. 1) that is formed when a receive beam is aligned with a transmit beam, that is, to perform beam alignment in order to achieve better quality of beam forming transmission. The quality of beam forming transmission may be estimated according to a power of a receive-beam signal. A beam angle corresponding to a maximum power of the receive-beam signal is the beam angle that is formed when the beams are aligned. First, the beam angle that is formed when the beams are aligned is found, then phase configuration is performed on the phase shifter using phase configuration information, which exists when the beams are aligned, of the phase shifter such that the receive beam is aligned with the transmit beam in order to improve the quality of beam forming transmission. It can be understood that due to a non-static environment, the quality of beam forming transmission may change with time. Therefore, phase configuration of the phase shifter needs to be continuously adjusted by means of a beam tracking process in order to change the quality of beam forming transmission.

For example, in one beam signal tracking process, beam scanning is performed with a scanning speed of n times per second (times/s) and a scanning angle step size of a degrees. Phase configuration of the phase shifter is performed at intervals of 1/n seconds to configure the phase shifter in sequence so that a beam angle changes −90, −90+a, −90+2a, −90+3a, . . . , −90+ma, 90. Received signal powers corresponding to different beam angles are simultaneously detected to obtain m+2 power values. A maximum received signal power is found in the m+2 power values, and a beam angle corresponding to the maximum received signal power, that is, a beam angle that is formed when the beams are aligned, is found accordingly. Then phase configuration is performed on the phase shifter using phase configuration information, which exists when the beams are aligned, of the phase shifter such that the receive beam is aligned with the transmit beam, to complete one beam tracking process. For example, it is assumed that beam tracking is performed using three degrees as a scanning angle step size. In one beam tracking process, beam scanning needs to be performed for 61 times. Scanning angles are sequentially −90, −87, −84, −81, . . . , 87, 90, that is, phase configuration of the phase shifter is performed for 61 times such that the beam angles are sequentially −90, −87, −84, −81, . . . , 87, 90. If a scanning speed is 50 times/s, it takes about 1.22 seconds to complete one beam tracking process. If a scanning speed is 100 times/s, it takes about 0.61 second to complete one beam tracking process. Correspondingly, 61 power values can be obtained for different beam angles. It is assumed that it is found by comparison that a received signal power corresponding to a beam angle of 45 degrees is maximum, and then phase configuration is performed on the phase shifter using phase configuration information of the phase shifter corresponding to the beam angle of 45 degrees such that the receive beam is aligned with the transmit beam. It can be understood that in order to obtain relatively good beam tracking quality, mainly, an appropriate scanning speed and scanning angle step size need to be selected in a beam tracking process.

Figure 3:
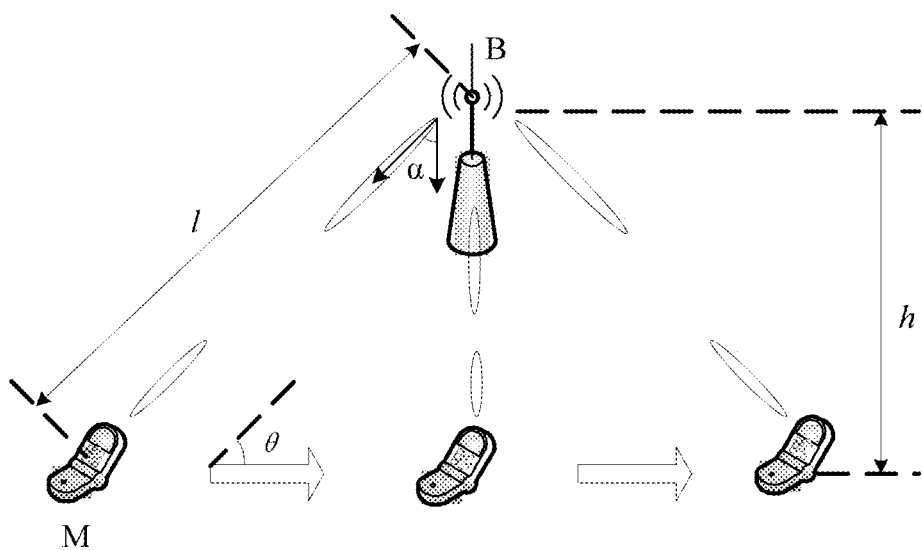
FIG. 3 is a schematic diagram of beam tracking in a mobile communications system.
Figure 4:
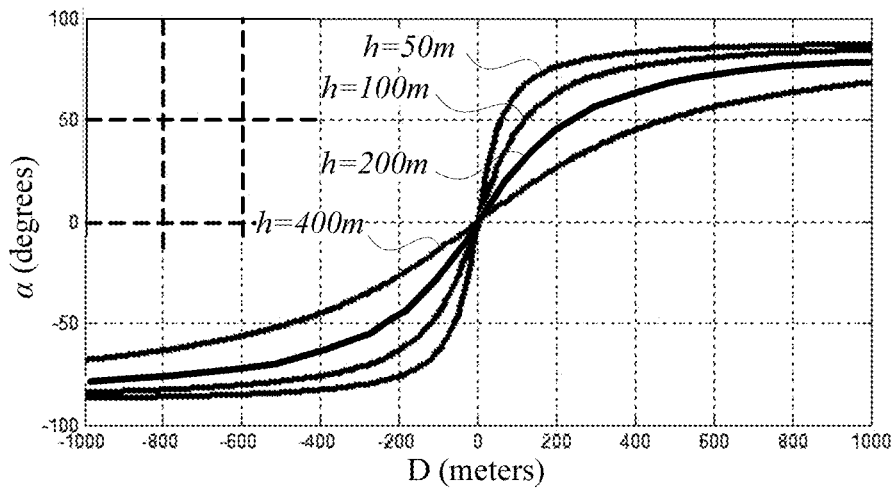
FIG. 4 is a schematic diagram of an emulation of a correspondence between a projection distance from a mobile station to a signal tower and a beam angle.
Figure 5:
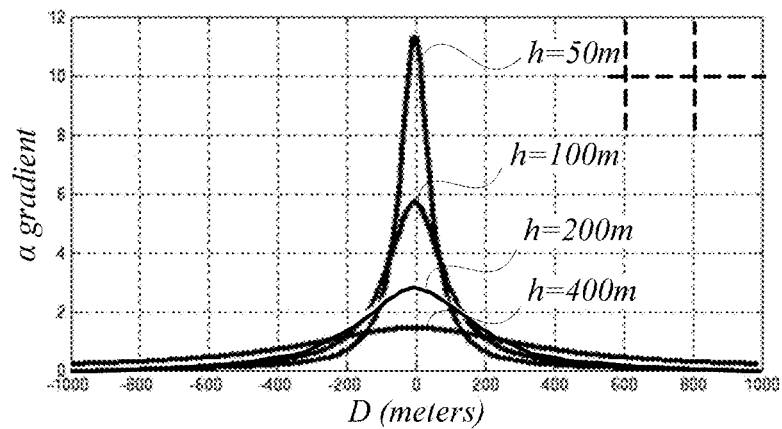
FIG. 5 is a schematic diagram of an emulation of a correspondence between a projection distance from a mobile station to a signal tower and a change gradient of a beam angle corresponding to FIG. 4.

An illustration of the beam tracking process is provided using a mobile communications system as an example. FIG. 3 is a schematic diagram of beam tracking in a mobile communications system. As shown in FIG. 3, in a moving process of a mobile station M, beam pointing of the mobile station M and a signal tower B is constantly maintained in a tracked state. A corresponding beam angle α continuously changes with the movement of the mobile station M such that a beam of the signal tower is aligned with a beam of the mobile station, ensuring transmission quality of beam forming in order to ensure continuity of a communications service. FIG. 4 is a schematic diagram of an emulation of a correspondence between a projection distance D from a mobile station to a signal tower and a beam angle α, FIG. 5 is a schematic diagram of an emulation of a correspondence between a projection distance D from a mobile station to a signal tower and a change gradient of a beam angle α corresponding to FIG. 4. For parameters α, h, and D in FIG. 4 and FIG. 5, refer to annotations shown in FIG. 3, where α is a beam angle in FIG. 3, h is a vertical distance between the mobile station M and the signal tower B in FIG. 3 (such as 50 meters (m), 100 m, 200 m, and 400 m), and D is a projection value, in a movement direction of the mobile station M, of a distance l between the mobile station M and the signal tower B in FIG. 3. It can be seen with reference to FIG. 3 to FIG. 5 that when the mobile station M moves close to or away from the signal tower B, the beam angle α changes. In addition, when a distance between the mobile station M and the signal tower B is relatively great, the beam angle α changes relatively slowly, and a gradient of the beam angle α is relatively small. When a distance between the mobile station M and the signal tower B is relatively small, the beam angle α changes drastically, and the gradient of the beam angle α is relatively great.

In addition, in the mobile communications system, when the mobile station M moves along a particular direction at a constant rate, due to an undesirable propagation path, the phase and frequency may change. Such a change is usually referred to as the Doppler effect. A difference, caused by the Doppler effect, between a frequency of a received signal and a frequency of a transmitted signal is referred to as a Doppler frequency shift. The Doppler effect affects quality of communication. How to eliminate or reduce impact of the Doppler effect on wireless communication is a problem that needs to be resolved to perform wireless communication during high-speed movement, and a commonly used method includes estimating a Doppler frequency shift, and compensating for a frequency offset of a received signal according to an estimation result.

The Doppler frequency shift of the communications system may be estimated according to a formula $$f_d = \frac{f}{c} \times v \times \cos\theta,$$

where c is an electromagnetic wave propagation speed in vacuum, f is a carrier frequency, v is a movement speed of the mobile station M, and θ is an angle between a movement direction of the mobile station M and a receive beam.

Figure 6:
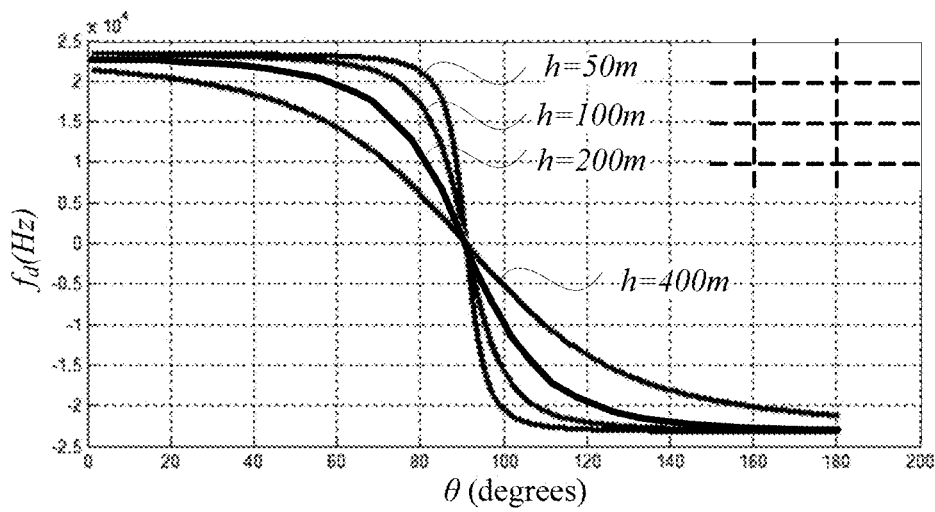
FIG. 6 is a schematic diagram of an emulation of a correspondence between θ and a Doppler frequency shift.
Figure 7:
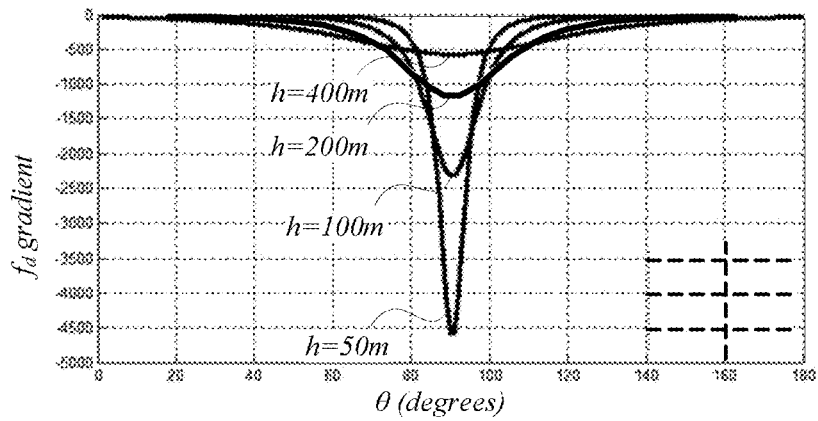
FIG. 7 is a schematic diagram of a correspondence between θ and a change gradient of a Doppler frequency shift corresponding to FIG. 6.

FIG. 6 is an emulation schematic diagram of a correspondence between θ and a Doppler frequency shift $f_d$ in hertz (Hz), FIG. 7 is a schematic diagram of a correspondence between θ and a change gradient of a Doppler frequency shift $f_d$ corresponding to FIG. 6. For parameters θ and h in FIG. 6 and FIG. 7, refer to annotations shown in FIG. 3, where θ is an angle between the movement direction of the mobile station M and the receive beam in FIG. 3, h is a distance between the mobile station M and the signal tower B, and $f_d$ is a Doppler frequency shift of a received signal. It can be seen with reference to FIG. 3, FIG. 6, and FIG. 7 that when the mobile station M moves close to or away from the signal tower B, the Doppler frequency shift $f_d$ changes. In addition, when a distance between the mobile station M and the signal tower B is relatively great, the Doppler frequency shift $f_d$ changes slowly, and a gradient of the Doppler frequency shift $f_d$ is relatively small. When a distance between the mobile station M and the signal tower B is relatively small, the Doppler frequency shift $f_d$ changes drastically, and the gradient of the Doppler frequency shift $f_d$ is relatively great.

According to FIG. 4 to FIG. 7, a correspondence between the Doppler frequency shift $f_d$ and the beam angle α in a wireless communications system can be obtained. Based on the above, in the embodiments of the present disclosure, the scanning speed and the scanning angle step size that are used for beam tracking can be determined according to the Doppler frequency shift $f_d$ change speed of the system.

Further, in an optional implementation manner, the Doppler frequency shift $f_d$ change speed may be obtained by calculating a gradient value of the Doppler frequency shift $f_d$. Alternatively, the Doppler frequency shift $f_d$ change speed is obtained by calculating a derivative value of the Doppler frequency shift $f_d$. Preferably, the gradient value and the derivative value of the Doppler frequency shift $f_d$ may be separately calculated, and then the Doppler frequency shift $f_d$ change speed is obtained according to an average value of the gradient value and the derivative value of the Doppler frequency shift $f_d$.

In an optional implementation manner, a table of correspondences between the Doppler frequency shift $f_d$ change speed and the scanning speed and between the Doppler frequency shift $f_d$ change speed and the scanning angle step size may be prestored in the beam signal tracking apparatus. The corresponding scanning speed and scanning angle step size may be obtained by directly looking up the table according to the Doppler frequency shift $f_d$ change speed, and this can simplify a data processing procedure and reduce load of a data processing unit. It can be understood that the table of correspondence between the Doppler frequency shift $f_d$ change speed and the scanning speed and between the Doppler frequency shift $f_d$ change speed and the scanning angle step size may be obtained by means of experiments and the like.

Further, the scanning speed and the scanning angle step size are determined according to the Doppler frequency shift $f_d$ change speed. In an optional implementation manner, the scanning speed and the scanning angle step size that are used for beam tracking may be obtained by looking up the table according to the gradient value of the Doppler frequency shift $f_d$. Alternatively, the scanning speed and the scanning angle step size that are used for beam tracking may be obtained by looking up the table according to the derivative value of the Doppler frequency shift. Preferably, a scanning speed $n_1$ and a scanning angle step size $a_1$ that are used for beam tracking may also first be obtained by looking up the table according to the gradient value of the Doppler frequency shift $f_d$. At the same time, a scanning speed $n_2$ and a scanning angle step size $a_2$ that are used for beam tracking may be obtained by looking up the table according to the derivative value of the Doppler frequency shift $f_d$. Then a scanning speed used for beam tracking is obtained according to an average value of $n_1$ and $n_2$, and a scanning angle step size used for beam tracking may be obtained according to an average value of $a_1$ and $a_2$.

In the beam signal tracking method provided in this embodiment, a scanning speed and a scanning angle step size during a beam tracking process are adaptively adjusted using the Doppler frequency shift $f_d$ change speed of a system. While beam tracking quality is ensured, maximum data transmission efficiency is achieved, and communication efficiency is improved. In addition, especially during high-speed mobile communication, in the beam signal tracking method provided in this embodiment, when a distance between Tx and Rx is relatively great, and a beam angle changes slowly or even does not change, the scanning speed and the scanning angle step size during the beam tracking process are adaptively adjusted, and data transmission efficiency is improved.

Figure 8:
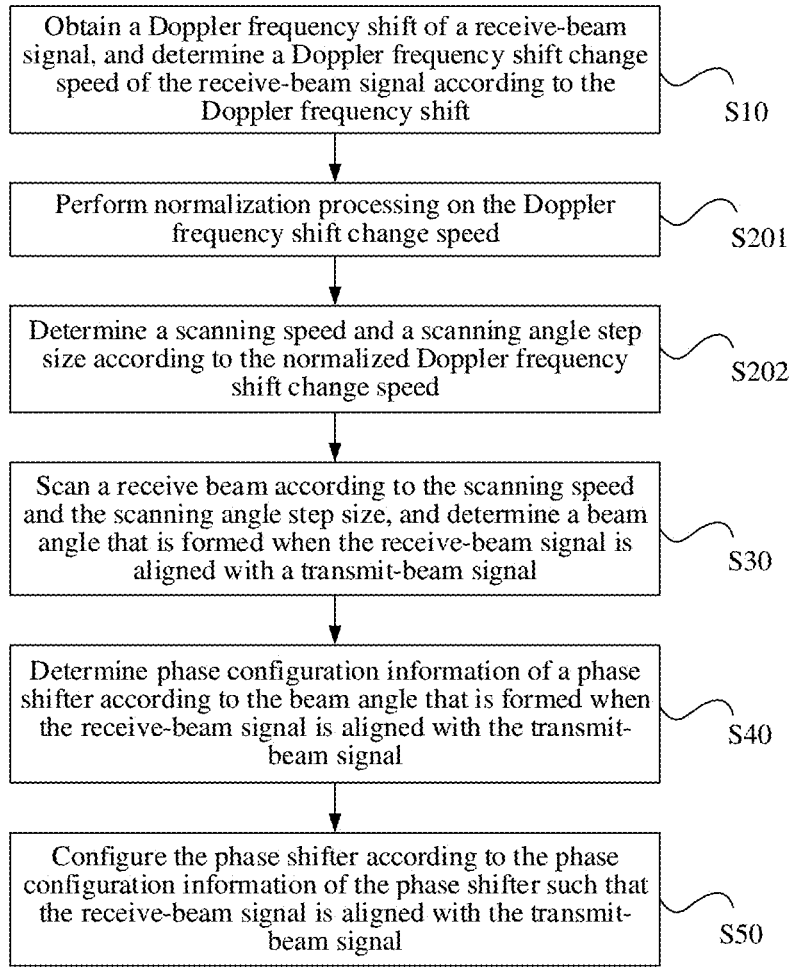
FIG. 8 is a schematic flowchart of another beam signal tracking method according to an embodiment of the present disclosure.

FIG. 8 is a schematic flowchart of another beam signal tracking method according to an embodiment of the present disclosure. As shown in FIG. 8, in this embodiment, based on the embodiment shown in FIG. 2, further, step S20 may include the following steps.

Step S201: Perform normalization processing on the Doppler frequency shift change speed.

Step S202: Determine a scanning speed and a scanning angle step size according to the normalized Doppler frequency shift change speed.

It can be understood that the purpose of normalization processing is to map to-be-processed data into a required range, for example, between 0 and 1, after normalization processing. For example, a common normalization processing method may be used. For example, in a deviation standardization (Min-Max Normalization) method, linear transformation may be performed on data in order to map a result value to [0-1]. Alternatively, in a standard deviation standardization (Z-score Normalization) method, data standardization may be performed according to a mean value and a standard deviation of data, and the processed data satisfies standard normal distribution, that is, the mean value is 0, and the standard deviation is 1. In this embodiment, the Doppler frequency shift change speed may be mapped to a relatively small particular interval by means of normalization processing such that the correspondence between the Doppler frequency shift change speed and the scanning speed and the correspondence between the Doppler frequency shift change speed and the scanning angle step size are more obvious to facilitate determining of the scanning speed and the scanning angle step size.

Further, in an optional implementation manner, the beam signal tracking apparatus may first determine a change trend of the Doppler frequency shift change speed according to the normalized Doppler frequency shift change speed, and then correspondingly adjust the scanning speed and the scanning angle step size according to the change trend of the Doppler frequency shift change speed.

The scanning speed and the scanning angle step size may be correspondingly increased if the normalized Doppler frequency shift change speed increases. The scanning speed and the scanning angle step size may be correspondingly reduced if the normalized Doppler frequency shift change speed decreases, and the scanning speed and the scanning angle step size are maintained if the normalized Doppler frequency shift change speed remains unchanged.

It can be understood that in this embodiment, the beam signal tracking apparatus may preset initial values of the scanning speed and the scanning angle step size that are used for beam tracking and then adjust the initial values of the scanning speed and the scanning angle step size according to the change trend of the normalized Doppler frequency shift change speed.

Further, the table of the correspondences between the normalized Doppler frequency shift change speed and the scanning speed and between the normalized Doppler frequency shift change speed and the scanning angle step size may be prestored in the beam signal tracking apparatus, and the scanning speed and the scanning angle step size may be obtained by directly looking up the table according to the normalized Doppler frequency shift change speed.

Because normalization processing can simplify calculation, in this embodiment, preferably, normalization processing is performed on the Doppler frequency shift change speed, and then the scanning speed and the scanning angle step size are determined according to the normalized Doppler frequency shift change speed such that the scanning speed and the scanning angle step size are determined more conveniently and quickly and a data processing procedure is simplified.

Figure 9:
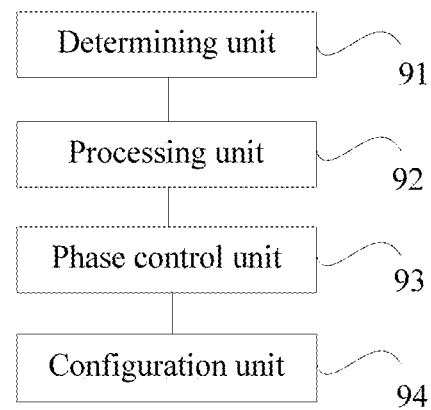
FIG. 9 is a schematic diagram of a beam signal tracking apparatus according to an embodiment of the present disclosure.

FIG. 9 is a schematic diagram of a beam signal tracking apparatus according to an embodiment of the present disclosure. The apparatus may be a control circuit configured to control phase configuration of a phase shifter in a phase antenna array system. The control circuit is connected to the phase shifter, and then the phase shifter is coupled to each antenna in the antenna array. A phase of the phase shifter is controlled such that beam pointing of Tx and Rx is constantly maintained in a tracked state. The beam signal tracking apparatus provided in this embodiment may execute steps of the beam signal tracking methods provided in the embodiments shown in FIG. 2 and FIG. 8 of the present disclosure. Details are not provided herein again.

As shown in FIG. 9, the beam signal tracking apparatus provided in this embodiment includes a determining unit 91, a processing unit 92, a phase control unit 93, and a configuration unit 94.

The determining unit 91 is configured to obtain a Doppler frequency shift of a receive-beam signal, and determine a Doppler frequency shift change speed of the receive-beam signal according to the Doppler frequency shift. The processing unit 92 is configured to determine a scanning speed and a scanning angle step size of the receive-beam signal according to the Doppler frequency shift change speed.

The determining unit 91 may be further configured to calculate a gradient value of the Doppler frequency shift to obtain the Doppler frequency shift change speed, or may be configured to calculate a derivative value of the Doppler frequency shift to obtain the Doppler frequency shift change speed. In an example of an implementation manner, in an actual application, the determining unit 91 may be further configured to calculate a gradient value and a derivative value of the Doppler frequency shift, and then calculate an average value of the gradient value and the derivative value of the Doppler frequency shift to obtain the Doppler frequency shift change speed.

The phase control unit 93 is configured to perform beam tracking according to the scanning speed and the scanning angle step size. In an actual application, the phase control unit 93 is further configured to scan the receive-beam signal according to the scanning speed and the scanning angle step size that are determined by the processing unit 92, and determine a beam angle that is formed when the receive-beam signal is aligned with a transmit-beam signal, where the beam angle that is formed when the receive-beam signal is aligned with the transmit-beam signal is a beam angle corresponding to a maximum power of the receive-beam signal. The configuration unit 94 is configured to determine phase configuration information of a phase shifter according to the beam angle that is formed when the receive-beam signal is aligned with the transmit-beam signal, and then configure the phase shifter according to the phase configuration information of the phase shifter such that the receive-beam signal is aligned with the transmit-beam signal.

In an optional implementation manner, the processing unit 92 may be further configured to query a table of correspondences between the Doppler frequency shift change speed and the scanning speed and between the Doppler frequency shift change speed and the scanning angle step size according to the Doppler frequency shift change speed to determine the scanning speed and the scanning angle step size.

In another optional implementation manner, the processing unit 92 may further be configured to perform normalization processing on the Doppler frequency shift change speed, and determine the scanning speed and the scanning angle step size according to the normalized Doppler frequency shift change speed.

Further, in an example of an implementation manner, in an actual application, the processing unit 92 may further include an adjustment module (not shown). The adjustment module may be configured to adjust the scanning speed and the scanning angle step size according to a change trend of the normalized Doppler frequency shift change speed.

In an actual application, the adjustment module may be further configured to increase the scanning speed and the scanning angle step size when the normalized Doppler frequency shift change speed increases, reduce the scanning speed and the scanning angle step size when the normalized Doppler frequency shift change speed decreases, and maintain the scanning speed and the scanning angle step size when the normalized Doppler frequency shift change speed remains unchanged.

It is worth mentioning that the beam signal tracking apparatus provided in this embodiment may be disposed at a transmit end or may be disposed at a receive end. A transmit device and a receive device may also be included in a single component and may share an antenna and/or a phase shifter or may share the beam signal tracking apparatus.

The beam signal tracking apparatus provided in this embodiment is configured to during a beam tracking process, adaptively adjust a scanning speed and a scanning angle step size in the beam tracking process. While beam tracking quality is ensured, maximum data transmission efficiency is achieved, and communication efficiency is improved.

The beam signal tracking apparatus provided in this embodiment is configured to execute the beam signal tracking methods provided in the embodiments shown in FIG. 2 and FIG. 8. Implementation principles and technical effects thereof are similar and are not described in detail herein again.

Figure 10:
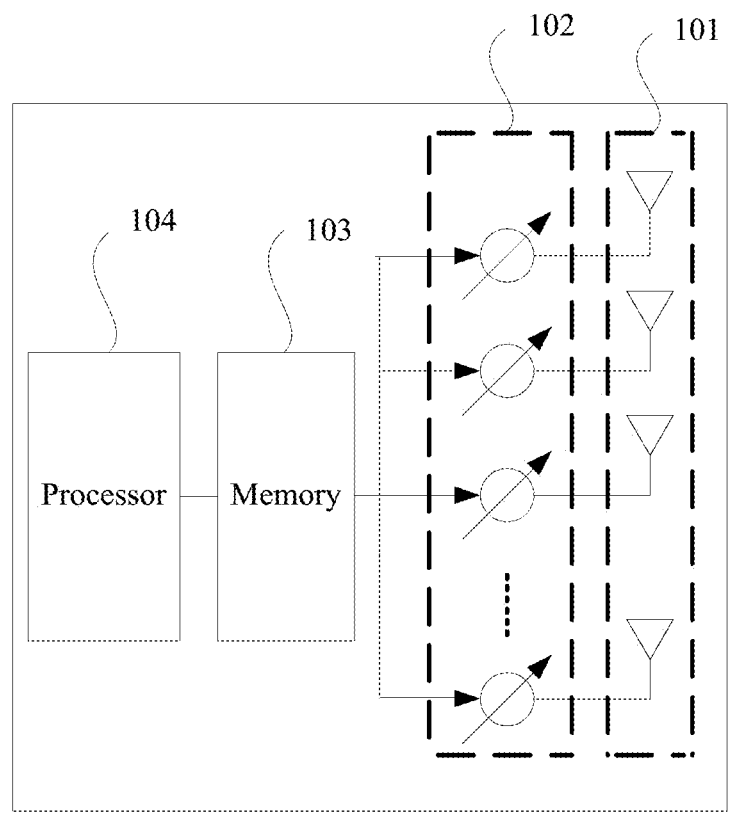
FIG. 10 is a schematic diagram of a communications device according to an embodiment of the present disclosure.

FIG. 10 is a schematic diagram of a communications device according to an embodiment of the present disclosure. The communications device may be a base station in a communications system or may be a mobile station, that is, user equipment. The communications device may implement steps of the beam signal tracking methods provided in the embodiments shown in FIG. 2 and FIG. 8 of the present disclosure, details are not described herein again.

As shown in FIG. 10, the communications device provided in this embodiment includes a transceiver antenna array 101, a phase shifter 102, a memory 103, and a processor 104 coupled with the memory 103. The phase shifter 102 is coupled to each antenna unit in the transceiver antenna array 101. The processor 104 may be configured to obtain a Doppler frequency shift of a receive-beam signal, determine a Doppler frequency shift change speed of the receive-beam signal according to the Doppler frequency shift, determine a scanning speed and a scanning angle step size of the receive-beam signal according to the Doppler frequency shift change speed, scan the receive-beam signal according to the scanning speed and the scanning angle step size, determine a beam angle that is formed when the receive-beam signal is aligned with a transmit-beam signal, where the beam angle that is formed when the receive-beam signal is aligned with the transmit-beam signal is a beam angle corresponding a maximum power of the receive-beam signal, determine phase configuration information of a phase shifter according to the beam angle that is formed when the receive-beam signal is aligned with the transmit-beam signal, and configure the phase shifter according to the phase configuration information of the phase shifter such that the receive-beam signal is aligned with the transmit-beam signal.

In an actual application, processor 104 may further perform normalization processing on the Doppler frequency shift change speed, and determine the scanning speed and the scanning angle step size according to the normalized Doppler frequency shift change speed.

For example, the scanning speed and the scanning angle step size are increased when the normalized Doppler frequency shift change speed increases. The scanning speed and the scanning angle step size are reduced when the normalized Doppler frequency shift change speed decreases, and the scanning speed and the scanning angle step size are maintained when the normalized Doppler frequency shift change speed remains unchanged.

In an actual application, in an optional implementation manner, the processor 104 may further calculate a gradient value of the Doppler frequency shift to obtain the Doppler frequency shift change speed, or calculate a derivative value of the Doppler frequency shift to obtain the Doppler frequency shift change speed.

In another optional implementation manner, the processor 104 may also calculate a gradient value and a derivative value of the Doppler frequency shift, and then calculate an average value of the gradient value and the derivative value of the Doppler frequency shift to obtain the Doppler frequency shift change speed.

The communications device provided in this embodiment may implement the beam signal tracking methods provided in the embodiments shown in FIG. 2 and FIG. 8. Implementation principles and technical effects thereof are similar and are not described in detail herein again.

An embodiment of the present disclosure further provides a phase control microwave communications system, including a base station and user equipment, where at least one of the base station and the user equipment includes the beam signal tracking apparatus provided in the embodiment shown in FIG. 9.

An embodiment of the present disclosure further provides a phase control microwave communications system, including the communications device provided in the embodiment shown in FIG. 10.

Persons of ordinary skill in the art may understand that all or some of the steps of the method embodiments may be implemented by a program instructing relevant hardware. The program may be stored in a computer-readable storage medium. The steps of the method embodiments are performed when the program runs. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A computer program product comprising computer-executable instructions for storage on a non-transitory computer-readable medium that, when executed by a processor, cause an apparatus to:
    obtain a Doppler frequency shift of a receive-beam signal;
    determine a Doppler frequency shift change speed of the receive-beam signal according to the Doppler frequency shift;
    determine a scanning speed and a scanning angle step size of the receive-beam signal according to the Doppler frequency shift change speed;
    scan the receive-beam signal according to the scanning speed and the scanning angle step size;
    determine a beam angle formed when the receive-beam signal is aligned with a transmit-beam signal, wherein the beam angle corresponds to a maximum power of the receive-beam signal;
    determine phase configuration information of a phase shifter according to the beam angle; and
    configure the phase shifter according to the phase configuration information of the phase shifter such that the receive-beam signal is aligned with the transmit-beam signal.

2. The computer program product of claim 1, wherein the computer-executable instructions cause the apparatus to determine the scanning speed and the scanning angle step size by:

performing normalization processing on the Doppler frequency shift change speed; and determining the scanning speed and the scanning angle step size according to the normalized Doppler frequency shift change speed.

3. The computer program product of claim 2, wherein the computer-executable instructions cause the apparatus to determine the scanning speed and the scanning angle step size by:

increasing the scanning speed and the scanning angle step size when the normalized Doppler frequency shift change speed increases;

decreasing the scanning speed and the scanning angle step size when the normalized Doppler frequency shift change speed decreases; and maintaining the scanning speed and the scanning angle step size when the normalized Doppler frequency shift change speed remains unchanged.

4. The computer program product of claim 1, wherein the computer-executable instructions cause the apparatus to determine the Doppler frequency shift change speed of the receive-beam signal by calculating a gradient value of the Doppler frequency shift of the receive-beam signal to obtain the Doppler frequency shift change speed.

5. The computer program product of claim 1 e wherein the computer-executable instructions cause the apparatus to determine the Doppler frequency shift change speed of the receive-beam signal by calculating a derivative value of the Doppler frequency shift of the receive-beam signal to obtain the Doppler frequency shift change speed.

6. The computer program product of claim 1, wherein the computer-executable instructions cause the apparatus to determine the Doppler frequency shift change speed of the receive-beam signal by:

calculating a gradient value and a derivative value of the Doppler frequency shift of the receive-beam signal; and calculating an average value of the gradient value and the derivative value of the Doppler frequency shift of the receive-beam signal to obtain the Doppler frequency shift change speed.

7. The computer program product of claim 1, wherein the apparatus comprises a beam signal tracking apparatus.

8. The computer program product of claim 1, wherein the apparatus comprises a communications device.

9. A beam signal tracking apparatus, comprising:

a memory comprising instructions; and a processor coupled to the memory, wherein the instructions cause the processor to be configured to:

obtain a Doppler frequency shift of a receive-beam signal;

determine a Doppler frequency shift change speed of the receive-beam signal according to the Doppler frequency shift;

determine a scanning speed and a scanning angle step size of the receive-beam signal according to the Doppler frequency shift change speed;

scan the receive-beam signal according to the scanning speed and the scanning angle step size;

determine a beam angle formed when the receive-beam signal is aligned with a transmit-beam signal, wherein the beam angle corresponds to a maximum power of the receive-beam signal;

determine phase configuration information of a phase shifter according to the beam angle; and configure the phase shifter according to the phase configuration information of the phase shifter such that the receive-beam signal is aligned with the transmit-beam signal.

10. The beam signal tracking apparatus of claim 9, wherein the instructions further cause the processor to he configured to:

perform normalization processing on the Doppler frequency shift change speed; and determine the scanning speed and the scanning angle step size according to the normalized Doppler frequency shift change speed.

11. The beam signal tracking apparatus of claim 10, wherein the instructions further cause the processor to be configured to:

increase the scanning speed and the scanning angle step size when the normalized Doppler frequency shift change speed increases;

decrease the scanning speed and the scanning angle step size when the normalized Doppler frequency shift change speed decreases; and maintain the scanning speed and the scanning angle step size when the normalized Doppler frequency shift change speed remains unchanged.

12. The beam signal tracking apparatus of claim 9, wherein the instructions further cause the processor to be configured to calculate a gradient value of the Doppler frequency shift to obtain the Doppler frequency shift change speed.

13. The beam signal tracking apparatus of claim 9, wherein the instructions further cause the processor to be configured to calculate a derivative value of the Doppler frequency shift to obtain the Doppler frequency shift change speed.

14. The beam signal tracking apparatus of claim 9, wherein the instructions further cause the processor to be configured to:

calculate a gradient value and a derivative value of the Doppler frequency shift; and calculate an average value of the gradient value and the derivative value of the Doppler frequency shift to obtain the Doppler frequency shift change speed.

15. A communications device, comprising:

a transceiver antenna array;

a phase shifter coupled to each antenna in the transceiver antenna array;

a memory coupled to the phase shifter; and a processor coupled to the memory and configured to:

obtain a Doppler frequency shift of a receive-beam signal;

determine a Doppler frequency shift change speed of the receive-beam signal according to the Doppler frequency shift;

determine a scanning speed and a scanning angle step size of the receive-beam signal according to the Doppler frequency shift change speed;

scan the receive-beam signal according to the scanning speed and the scanning angle step size;

determine a beam angle formed when the receive-beam signal is aligned with a transmit-beam signal, wherein the beam angle corresponds to a maximum power of the receive-beam signal;

determine phase configuration information of the phase shifter according to the beam angle; and configure the phase shifter according to the phase configuration information of the phase shifter such that the receive-beam signal is aligned with the transmit-beam signal.

16. The communications device of claim 15, wherein the processor is further configured to:
   perform normalization processing on the Doppler frequency shift change speed; and
   determine the scanning speed and the scanning angle step size according to the normalized Doppler frequency shift change speed.

17. The communications device of claim 16, wherein the processor is further configured to:
   increase the scanning speed and the scanning angle step size when the normalized Doppler frequency shift change speed increases;
   decrease the scanning speed and the scanning angle step size when the normalized Doppler frequency shift change speed decreases; and
   maintain the scanning speed and the scanning angle step size when the normalized Doppler frequency shift change speed remains unchanged.

18. The communication device of claim 15, wherein the processor is further configured to calculate a gradient value of the Doppler frequency shift to obtain the Doppler frequency shift change speed.

19. The communications device of claim 15, wherein the processor is further configured to calculate a derivative value of the Doppler frequency shift to obtain the Doppler frequency shift change speed.

20. The communications device of claim 15, wherein the processor is further configured to:
   calculate a gradient value and a derivative value of the Doppler frequency shift; and
   calculate an average value of the gradient value and the derivative value of the Doppler frequency shift to obtain the Doppler frequency shift change speed.

* * * * *

UNITED STATES PATENT AND TRADEMARK OFFICE
CERTIFICATE OF CORRECTION

PATENT NO. : 10,622,713 B2
APPLICATION NO. : 15/821404
DATED : April 14, 2020
INVENTOR(S) : Jun Ma Page 1 of 1

It is certified that error appears in the above-identified patent and that said Letters Patent is hereby corrected as shown below:

In the Claims

Claim 5, Column 15, Line 26: "claim 1 e wherein" should read "claim 1, wherein"

Signed and Sealed this
Sixteenth Day of June, 2020

Andrei Iancu
*Director of the United States Patent and Trademark Office*